UNITED STATES PATENT OFFICE.

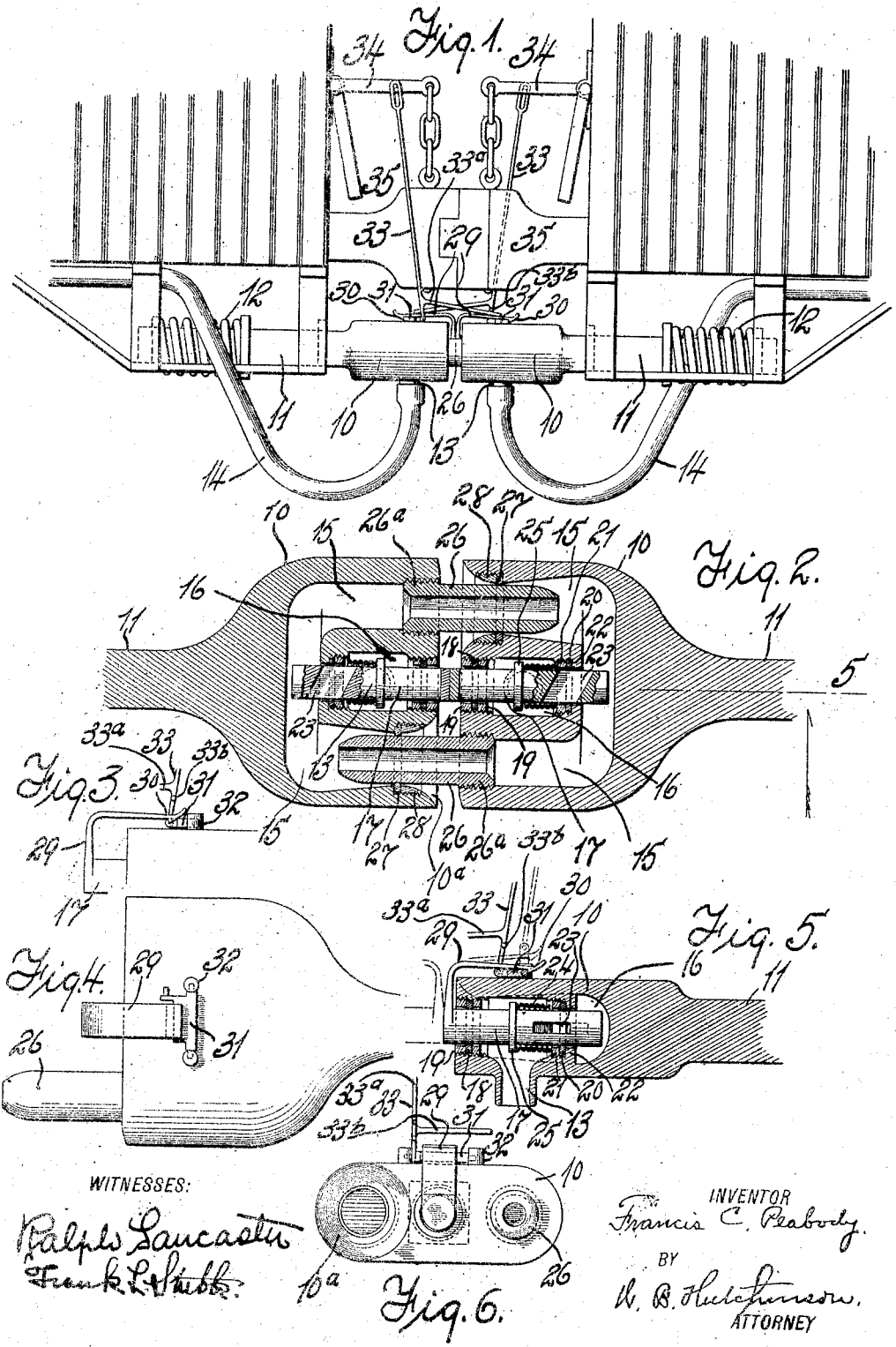

FRANCIS C. PEABODY, OF ST. PAUL, MINNESOTA.

AIR-COUPLING.

No. 864,487.          Specification of Letters Patent.          Patented Aug. 27, 1907.

Application filed December 29, 1906. Serial No. 350,064.

*To all whom it may concern:*

Be it known that I, FRANCIS C. PEABODY, of the city of St. Paul, Ramsey county, State of Minnesota, have invented a new and Improved Air-Coupling, of which the following is a full, clear, and exact description.

My invention relates to improvements in air couplings such as are used in connection with the train pipes of railway cars, to connect the pipes of opposed cars.

The object of my invention is to produce an automatic coupling of this character which can be easily applied to existing cars, and which will couple easily so as to make a perfect air connection between the opposite train pipes, and which can be uncoupled automatically when the car couplings are released. For this last reason it will be seen that the improved coupling is desirable, as it obviates the danger caused by sending a brakeman between the cars to release the air couplings.

My invention is intended further to produce a coupling of this kind which is very simple, has few parts to get out of order, and which when uncoupled designedly will retain the air in the train pipe, but if the coupling be broken, the train line will be left open, the same as with the air hose now in use, thus releasing the air and setting the brakes.

With these ends in view, and with the general object of making a simple and efficient air coupling, my invention consists of certain features of construction and combinations of parts which will be hereinafter described and claimed.

Reference is to be had to the accompanying drawings forming a part of this specification, in which similar figures of reference indicate corresponding parts in all the views.

Figure 1 is a side elevation of my improved coupling as applied to a car, and shows the position of connected couplings. Fig. 2 is a longitudinal sectional plan of the coupling, showing two united couplings. Fig. 3 is a broken detail showing the position of the spring catch when released. Fig. 4 is a top or plan view of a single coupling. Fig. 5 is a longitudinal section on the line 5 of Fig. 2 of the single coupling, and Fig. 6 is a front end view of one of the couplings.

The coupling has a head 10, which can be of any approved shape, but is externally much as usual, and it is mounted in the customary manner, having a shank 11 which is pressed forward by the spring 12. The head has also on the under side a nipple 13 connecting precisely as usual with the train pipe 14, and opening into a small chamber 16. Within the head 10 is a main chamber formed of the two parts 15, and communication between the chambers 15 and 16 is controlled by the sliding valve 17 which projects from the end of the central portion of the coupler head, and is adapted to be pushed inward to obtain communication between the two air chambers by contact with an opposed head of a corresponding valve.

The valve 17 slides in a gasket 18 near the front end of the coupling, which gasket can be held conveniently in place by the nuts 19, and the valve also slides through a rear gasket or packing ring 20, which is held by the nut 21 against a shoulder 22 in the coupling. The valve has a port 23 cut obliquely through it, and when the valve is pushed inward to the position shown in Fig. 2, the air can pass freely from one part 15 of the air chamber to the part 16. The valve is normally pressed forward so as to close the port 23, by a spring 24, which is coiled around the valve and presses against the collar 25. It will be seen that when the valve is pressed forward, the inner end of the port 23 will be in front of the gasket or ring 20, and so communication between the two parts of the air chamber will be cut off, and it will be further observed that the collar 25 besides serving as an abutment for the spring 24, also serves to limit the forward movement of the valve.

One side of the air chamber 15 has a flaring mouth 10ᵃ at the front end of the head 10, and the chamber communicates with the chamber of the opposed coupler through a nipple 26, which has preferably a rounded end so that it can readily enter the mouth 10ᵃ of the opposed coupler head, and it can be secured in any convenient way, as by means of the screw thread shown at 26ᵃ.

The outer end of the valve 17 has an upwardly and rearwardly extending spring arm 29, which terminates in a catch 30, and this is adapted to engage the tilting block 31, which is pivoted between bosses 32 on the top of the head 10. The block 31 connects by means of a rod 33 with the tilting lever 34 of the car coupler 35.

In order that both catches 30 may be released by operating one car coupling, the rod 33 has a lateral arm 33ᵃ which extends beneath a pin 33ᵇ on the opposed rod (see Fig. 1) and consequently it will be seen that when the car coupling is operated as usual from the side of the car, by lifting the lever 34, the latter will lift up the spring arm 29 of each coupling as shown by dotted lines in Fig. 5, and the arm 29 actuated by the spring 24, will then pull against the block 31 off the center of the block, so that the valve 17 can slide freely forward to closed position, and thus it will be seen that the uncoupling of the car coupling serves automatically to uncouple the air coupling. While I have shown a particular form of spring arm and catch connected with a peculiar tilting lever 34, it is obvious that the invention is not restricted to this precise mechanism, but that many devices might be used for releasing the valve 17 to the action of its spring by the uncoupling of the car.

It will be seen that I have shown a very simple coupling which works automatically, and is contained in a compact head so that the parts are not likely to be disarranged, but are positive in operation, and that while for the reasons stated it is better than the usual hose, still it has the same function, and if the coupling breaks apart, the train line will be left open the same as with the hose, thus releasing the air and setting the brakes.

Having thus fully described my invention, I claim as new and desire to secure by Letters Patent:—

1. An air coupling of the kind described, comprising a coupler head having an air chamber therein with plural openings to connect with the corresponding chamber of an opposed coupling, a second chamber within the first chamber connecting with the train pipe, and a spring pressed normally closed valve having a port therein to connect the two chambers, and arranged to be opened by contact with an opposed valve.

2. A coupling of the kind described, comprising a head having communicating chambers, from one of which projects a forwardly extending nipple, and the other of which connects with the train pipe, and the spring pressed slide valve moving longitudinally in the head and projecting from the end thereof, the said valve having a port adapted to connect the two chambers.

3. An air coupling of the kind described, comprising a head having two air chambers, one of which connects with the train pipe, means for connecting the main chambers with the corresponding chambers of an opposed coupling, and a slide valve projecting from the end of the head and having a port therein adapted to open an air passage between the two chambers of the head.

4. An air coupling comprising a head having air chambers therein, one of which connects with the train pipe, and the other of which is adapted to have connection with the chamber of an opposed head, a slide valve movable longitudinally in the head and having a port connecting with the two chambers, and a locking device to hold the valve open.

5. An air coupling comprising a head having plural air chambers therein, one connecting with the train pipe, and the other adapted to connect with the chambers of an opposed coupling, a slide valve having a port to open connection between the two chambers, a locking device to hold the valve open, and a connection between the locking device and a car coupling, whereby the uncoupling of the car coupler releases the locking device.

6. In a structure of the kind described, the combination with the air coupler having air chambers, one of which connects with the train pipe and the other with the chambers of an opposed coupler, a slide valve adapted to open communication between the two chambers, and a locking device to hold the valve open, of a car coupling, and an operative connection between the car coupling and the locking device, whereby the uncoupling of the car releases the locking device.

7. In a structure of the kind described, the combination with the coupler head having two chambers therein, one connecting with the train pipe and the other with the chambers of an opposed coupling, and a slide valve controlling the connection between the chambers, of a spring catch on the valve, and the tilting block to engage the catch.

8. The combination with the coupler head having two chambers therein, one of which connects with the train pipe and the other of which is adapted to connect with the chambers of an opposed coupling, of the spring pressed slide valve movable longitudinally in the head, and having an oblique port therein adapted to open communication between the two chambers.

9. A structure such as described, comprising a head having an air chamber therein, the front end of the chamber being open on one side and the other provided with a projecting nipple, a second air chamber in the head, connecting with the train pipe, and a slide valve projecting from the head and through the valve of the second chamber, the said valve being arranged to open air connections between the two chambers.

10. A structure such as described, comprising a head having an air chamber therein adapted to connect with the chamber of an opposed head, a connection between the train pipe and the head, and a slide valve actuated by contact with an opposed valve, and controlling communication between the train pipe and the main air chamber.

FRANCIS C. PEABODY.

Witnesses:
LLOYD PEABODY,
CHAS. LINDAHL.